(12) United States Patent
Sugahara et al.

(10) Patent No.: US 9,054,591 B2
(45) Date of Patent: Jun. 9, 2015

(54) SWITCHING POWER SUPPLY APPARATUS AND METHOD OF CONTROLLING SWITCHING POWER SUPPLY APPARATUS

(71) Applicant: Sanken Electric Co., LTD., Niiza-shi, Saitama (JP)

(72) Inventors: Takeki Sugahara, Saitama (JP); Yoshimichi Tadamasa, Saitama (JP)

(73) Assignee: Sanken Electric Co., LTD., Niiza-shi, Saitama (JP)

( * ) Notice: Subject to any disclaimer, the term of this patent is extended or adjusted under 35 U.S.C. 154(b) by 200 days.

(21) Appl. No.: 13/729,527

(22) Filed: Dec. 28, 2012

(65) Prior Publication Data

US 2014/0185336 A1 Jul. 3, 2014

(51) Int. Cl.
*H02M 3/335* (2006.01)

(52) U.S. Cl.
CPC .................. *H02M 3/33523* (2013.01)

(58) Field of Classification Search
CPC ............... H02M 3/33507; H02M 2001/0009; H02M 1/12; H02M 3/33561; H02M 7/003
USPC ........ 363/17, 20, 26, 28, 21.01, 21.04, 21.05, 363/21.08, 21.12, 21.16, 97, 124, 131
See application file for complete search history.

(56) References Cited

U.S. PATENT DOCUMENTS

| | | | |
|---|---|---|---|
| 6,744,649 B1 * | 6/2004 | Yang et al. | 363/98 |
| 6,956,750 B1 * | 10/2005 | Eason et al. | 363/21.01 |
| 7,492,615 B2 * | 2/2009 | Morota et al. | 363/21.16 |
| 7,778,050 B2 * | 8/2010 | Yamashita | 363/21.16 |
| 8,125,799 B2 * | 2/2012 | Zhu et al. | 363/21.14 |
| 8,213,203 B2 * | 7/2012 | Fei et al. | 363/131 |
| 2010/0134182 A1 | 6/2010 | Kapoor et al. | |
| 2013/0148387 A1 * | 6/2013 | Ren et al. | 363/21.16 |

* cited by examiner

*Primary Examiner* — Rajnikant Patel
(74) *Attorney, Agent, or Firm* — Banner & Witcoff, Ltd.

(57) ABSTRACT

A switching power supply apparatus includes a transformer having a primary winding, a secondary winding, and an auxiliary winding, a switching element coupled in series to the primary winding; an output circuit section generating a voltage output from power transferred from the primary winding to the secondary winding in response to a switching operation of the switching element, a feedback signal generation circuit section configured to, during a secondary side conduction period in which an electric current flows through the secondary winding, generate a feedback signal having a signal level corrected based on a length of the secondary side conduction period, from an auxiliary winding voltage induced in the auxiliary winding, and a control circuit section driving the switching element based on the feedback signal.

7 Claims, 11 Drawing Sheets

SWITCHING POWER SUPPLY APPARATUS AND METHOD OF CONTROLLING SWITCHING POWER SUPPLY APPARATUS

TECHNICAL FIELD

The invention relates, in general, to a switching power supply apparatus and a control method thereof.

BACKGROUND ART

Regarding a switching power supply apparatus in which input and output sides thereof are electrically isolated by a transformer, PSR (primary-side regulated type) switching power supply apparatus has been known in which an auxiliary winding, to which a voltage proportional to a voltage generated to a secondary winding of the transformer is induced, is provided on a primary side to thereby regulate an output voltage based on the voltage induced in the auxiliary winding (e.g. U.S. Pat. No. 8,125,799 B2 and US 2012/0134182 A1).

The switching power supply apparatus described in the Patent Documents has a circuit which detects reduction in an output voltage resulting from a sudden load change from light load or no load and thus outputs a voltage reduction signal to the secondary winding. The switching power supply apparatus performs a switching operation based on the voltage reduction signal transferred from the secondary winding to the auxiliary winding to thereby suppress the reduction in the output voltage resulting from the sudden load change.

SUMMARY

In the application example of the switching power supply apparatus such as chargers of mobile appliances such as smart phones, tablet terminals, etc, generally, a power supply device and a device (load) which is fed with power from the power supply device are connected by a cable. In this case, a voltage drop occurs due to impedance of the cable, so that an output voltage at the end of the cable is lower than that of the power supply device. Further, as load connected to the cable increases, the voltage drop from the cable increases.

Although the switching power supply apparatus described in the Patent Documents can suppress the voltage change at the output of the power supply device due to the sudden load change, the power supply device cannot suppress the voltage drop at the output of a cable due to the voltage drop caused by the cable.

Accordingly, the present invention has been made with considering the above problems, and an object of the present invention is to provide a switching power supply apparatus capable of supplying a stabilized voltage to a load, irrespective of a voltage drop from a cable that changes according to the load, and a control method thereof.

In an aspect, the present invention provides a switching power supply apparatus comprising: a transformer having a primary winding, a secondary winding, and an auxiliary winding; a switching element coupled in series to the primary winding; an output circuit section configured to generate a voltage output from the power transferred from the primary winding to the secondary winding in response to a switching operation of the switching element; a feedback signal generation circuit section configured to, during a secondary side conduction period in which an electric current flows through the secondary winding, generate a feedback signal having a signal level corrected based on a length of the secondary side conduction period, from an auxiliary winding voltage induced in the auxiliary winding; and a control circuit section configured to drive the switching element based on the feedback signal.

In another aspect, the present invention provides a method of controlling a switching power supply apparatus comprising: a transformer having a primary winding, a secondary winding, and an auxiliary winding; and a switching element coupled in series to the primary winding, power being transferred from the primary winding to the secondary winding in response to a switching operation of the switching element, the method comprising: generating a feedback signal having a signal level corrected based on a length of the secondary side conduction period, from a voltage induced in the auxiliary winding during a secondary side conduction period in which an electric current flows through the secondary winding; and driving the switching element based on the feedback signal.

According to one of the aspects, a stabilized voltage can be supplied to a load, irrespective of a voltage drop from a cable that changes according to the load.

DESCRIPTION OF EXEMPLARY EMBODIMENT

Figure 1:
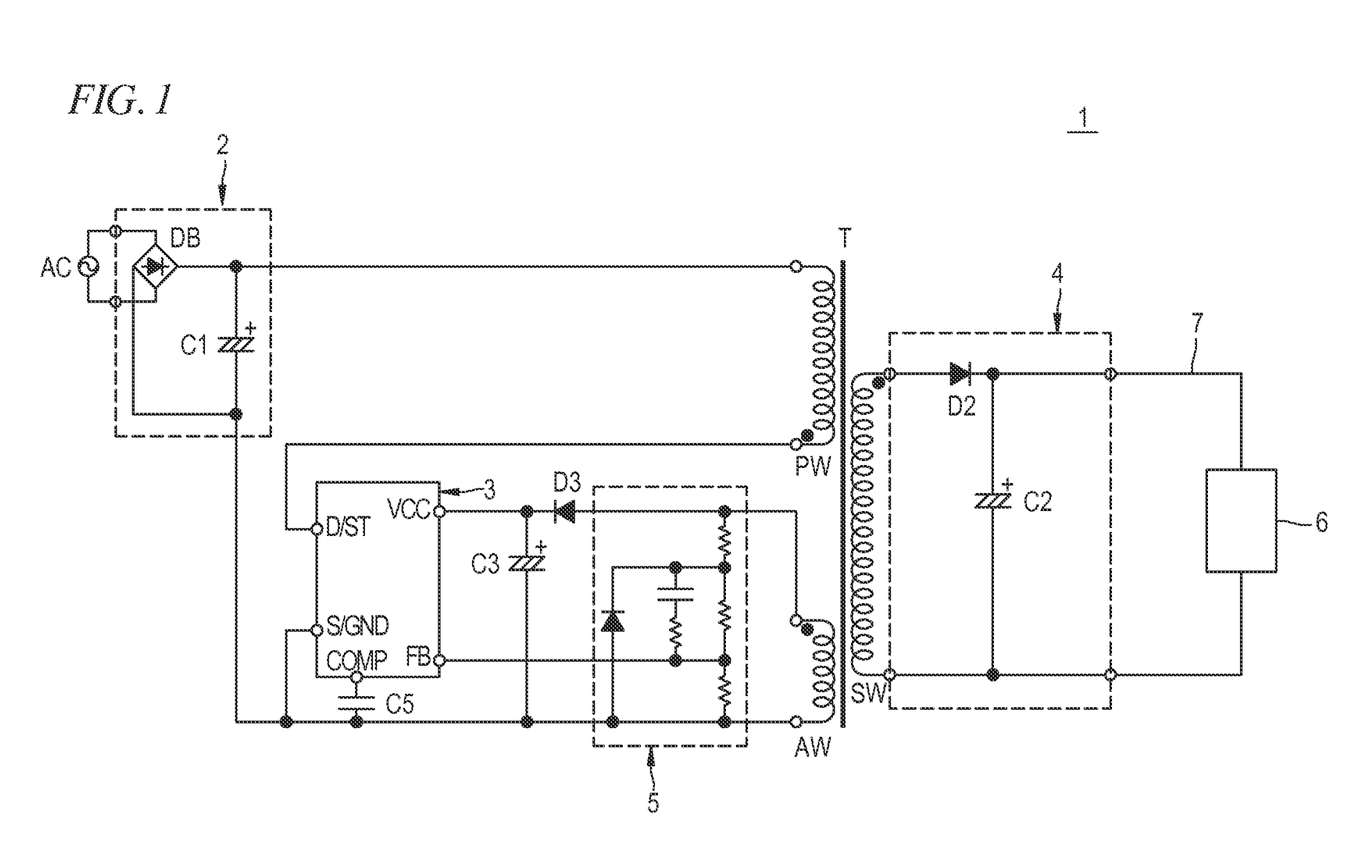
FIG. 1 is a block diagram of an exemplary switching power supply apparatus to describe an illustrative embodiment.

FIG. 1 shows an illustrative configuration of an exemplary switching power supply apparatus to describe an illustrative embodiment.

The switching power supply apparatus 1 of FIG. 1 includes a power source circuit section 2, a transformer T, a control circuit section 3 having a switching element, an output circuit section 4 for generating an output voltage, and a feedback signal generation circuit section 5 for stabilizing the output voltage from the output circuit section 4.

The power source circuit section 2 includes a diode bridge rectifier DB and a capacitor C1 to rectify and smooth an alternating current power input from an alternating power source AC.

The transformer T includes a primary side having a primary winding PW and an auxiliary winding AW, and a secondary side having a secondary winding SW. A polarity of the primary winding PW is set to be opposed to those of the secondary winding SW and the auxiliary winding AW.

The primary winding PW is coupled to the power source circuit section 2 via the switching element of the control circuit section 3. The secondary winding SW is coupled to the output circuit section 4 having a diode D2 and a capacitor C2.

According to a switching operation of the switching element of the control circuit section 3, the power is transmitted from the primary side to the secondary side of the transformer T, and the power transmitted to the secondary side is rectified and smoothed by the diode D2 and the capacitor C2 of the output circuit section 4. Thereby, a direct current power is fed to a load 6 that is coupled to the output circuit section 4 via a cable 7.

The auxiliary winding AW is coupled to the feedback signal generation circuit section 5. The feedback signal generation circuit section 5 generates a feedback signal from a voltage that is induced in the auxiliary winding AW in response to the switching operation of the switching element of the control circuit section 3.

In the illustrative embodiment, a capacitor C3 is coupled to the auxiliary winding AW via a diode D3, and a positive terminal of the capacitor C3 is coupled to a power source voltage input terminal VCC of the control circuit section 3. The voltage that is induced in the auxiliary winding AW is rectified and smoothed by the diode D3 and the capacitor C3, is supplied to the VCC of the control circuit section 3, and is used as a power source voltage for driving the control circuit section 3.

Figure 2:
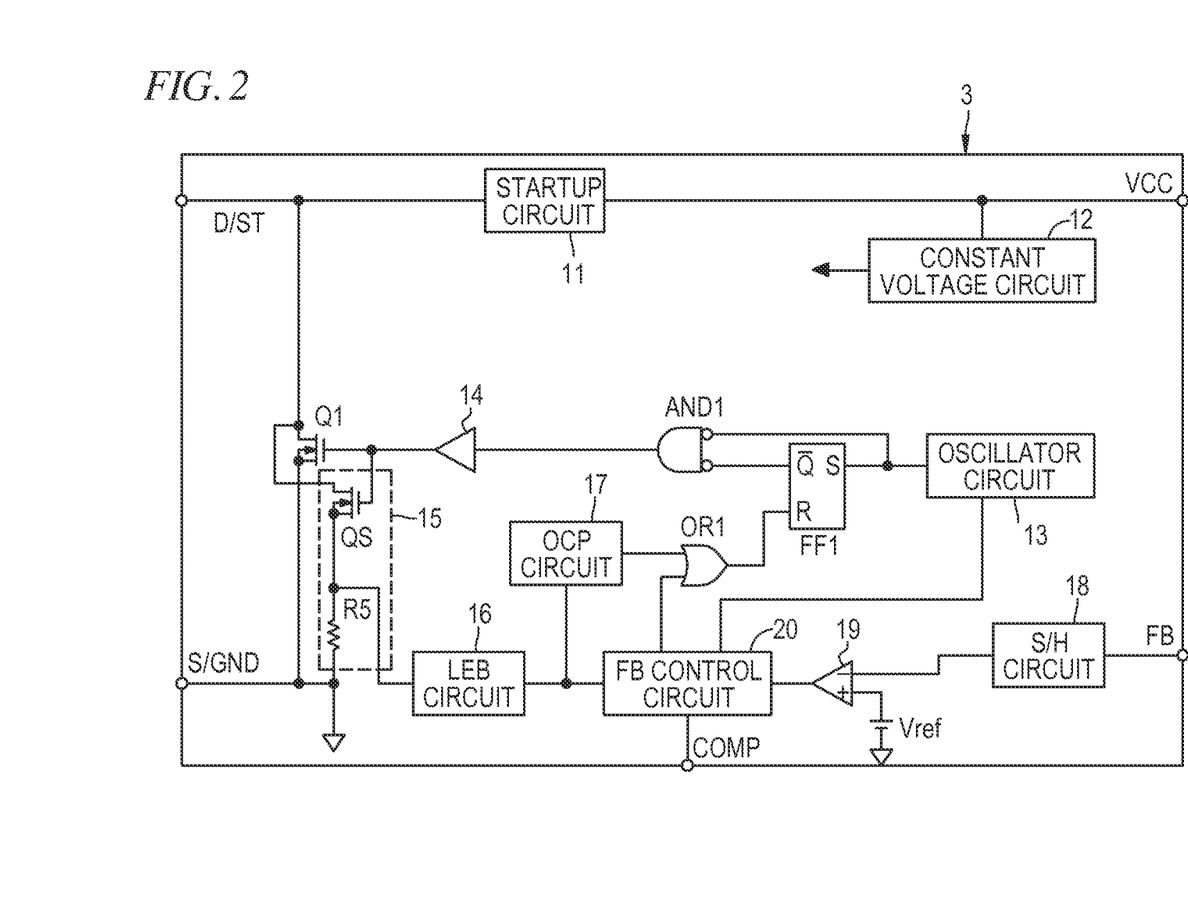
FIG. 2 is a block diagram of a control circuit section of the switching power supply apparatus shown in FIG. 1.
Figure 3:
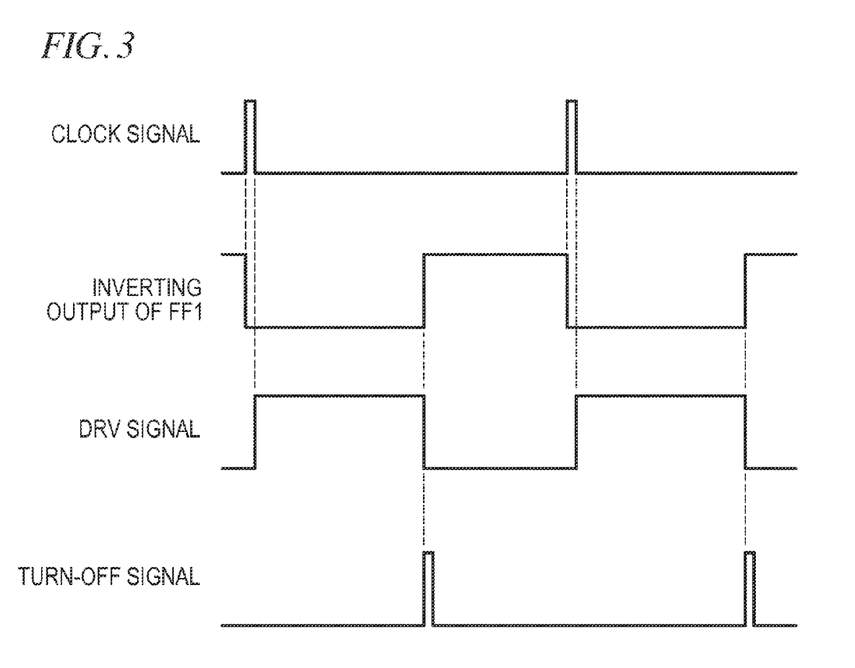
FIG. 3 is a waveform diagram showing operations of respective units of the control circuit section of FIG. 2.

FIG. 2 shows the configuration of the control circuit section 3, and FIG. 3 shows operations of respective units of the control circuit section 3.

The control circuit section 3 operates with a voltage input to the VCC as a power source voltage, and controls a switching operation of a switching element Q1 to stabilize an output voltage of the output circuit section 4.

The control circuit section 3 includes the switching element Q1, a startup circuit 11, a constant voltage circuit 12, an oscillator circuit 13, a driver circuit 14, a current detector circuit 15, a leading edge blanket (LEB) circuit 16, an over-current protection (OCP) circuit 17, a sample hold (S/H) circuit 18, an error amplifier circuit 19, and a feedback (FB) control circuit 20.

The switching element Q1 is a power metal oxide semiconductor field effect transistor (MOSFET) that is an N type transistor in the illustrative embodiment. A drain of the switching element Q1 is coupled to the primary winding PW (FIG. 1) of the transformer T via a D/ST terminal of the control circuit section 3, and a source of the switching element Q1 is coupled to a negative terminal of the capacitor C1 (FIG. 1) via an S/GND terminal of the control circuit section 3.

The startup circuit 11 is located between the D/ST terminal of the control circuit section 3 coupled to the positive terminal of the capacitor C1 and the VCC of the control circuit section 3 coupled to the positive terminal of the capacitor C3 (FIG. 1). The startup circuit 11 is a constant current circuit that first operates prior to the start of the switching control and then supplies a constant current to the capacitor C3 coupled to the VCC.

The constant voltage circuit 12 is configured to convert a VCC input voltage to an operation voltage of respective units of the control circuit section 3 and then supplies the operation voltage to the respective units of the control circuit section 3.

The oscillator circuit 13 outputs a clock signal for turn-on of the switching element Q1 at regular periodic intervals. A frequency of the clock signal ranges e.g. between 20 kHz and 150 kHz, preferably between 60 kHz and 80 kHz. The clock signal output from the oscillator circuit 13 is input to both a set terminal S of a flip-flop circuit FF1 and one inverting input terminal of an AND circuit AND1. An inverting output Q⁻ of the flip-flop circuit FF1 is input to the other inverting input terminal of the AND circuit AND1. An output signal of the AND1 is input to the driver circuit 14.

The driver circuit 14 is coupled to a gate of the switching element Q1. The driver circuit 14 converts the output signal of the AND1 to a voltage signal sufficient enough to control the gate of the switching element Q1, and generates a drive signal (DRV) to drive the switching element Q1. Hence, as shown in FIG. 3, the switching element Q1 is turned on as the clock signal falls down.

The current detector circuit 15 is a circuit that detects a drain current flowing through the switching element Q1 and has a sensing switching element Qs and a resistance R5. A drain of the sensing switching element Qs is coupled to the D/ST terminal of the control circuit section 3, and a source of the sensing switching element Qs is coupled to the S/GND terminal of the control circuit section 3 via the resistance R5. A gate of the sensing switching element Qs is coupled to the driver circuit 14 and is turned ON and OFF in synchronization with the switching element Q1. A voltage occurring at a connection point between the source of the sensing switching element Qs and the resistance R5 is input to the LEB circuit 16 as a drain current detection signal.

The LEB circuit 16 blanks a signal at the time when a surge voltage is generated upon turn-on of the sensing switching element Qs, among drain current-detection signals output from the current detector circuit 15. The drain current-detection signal output from the current detector circuit 15 is input to both the OCP circuit 17 and the FB control circuit 20 via the LEB circuit 16.

The OCP circuit 17 is configured to compare the drain current-detection signal with an over-current detection threshold voltage Vocp, and to output a turn-off signal when the drain current-detection signal, i.e., a voltage drop of the resistance R5 relative to the S/GND voltage, reaches the Vocp. The turn-off signal is input to a reset terminal R of FF1 via an OR circuit OR1. Thereby, the switching element Q1 is turned off as shown in FIG. 3.

The S/H circuit 18 is configured to detect the falling of the feedback signal $V_{FB}$ input to the feedback (FB) terminal of the control circuit section 3 from the feedback signal generation circuit section 5 (FIG. 1), and to hold a voltage just before the falling occurs. The voltage held by the S/H circuit 18 is input to an inverting input terminal of the error amplifier circuit 19. The feedback signal held in the S/H circuit 18 is updated when the S/H circuit 18 detects the falling of the next feedback signal $V_{FB}$.

The error amplifier circuit 19 is configured to amplify a difference between the voltage held in the S/H circuit 18 and a reference voltage $V_{REF}$ that is applied to a non-inverting input terminal thereof, and to generate an error-amplification signal $V_{EAO}$. The error-amplification signal $V_{EAO}$ is input to the FB control circuit 20.

The FB control circuit 20 is coupled to a feedback phase-correction (COMP) terminal of the control circuit section 3 to which a capacitor C5 for phase correction (FIG. 1) is coupled. The FB control circuit 20 is configured to compare the drain current-detection signal input via the LEB circuit 16 with the phase-corrected error-amplification signal $V_{EAO}$, and if the drain current-detection signal exceeds the error-amplification signal $V_{EAO}$, to output a turn-off signal. This turn-off signal is input to the reset terminal of FF1 via the OR circuit OR1. Thereby, the switching element Q1 is turned off as shown in FIG. 3.

The FB control circuit 20 is configured to control an ON range of the switching element Q1 based on the drain current-detection signal and the phase-corrected error-amplification signal $V_{EAO}$ such that the ON range is made longer as the output voltage of the output circuit section 4 is low and the error-amplification signal $V_{EAO}$ is high. Thereby, the switching element Q1 is turned off as shown in FIG. 3.

Figure 4:
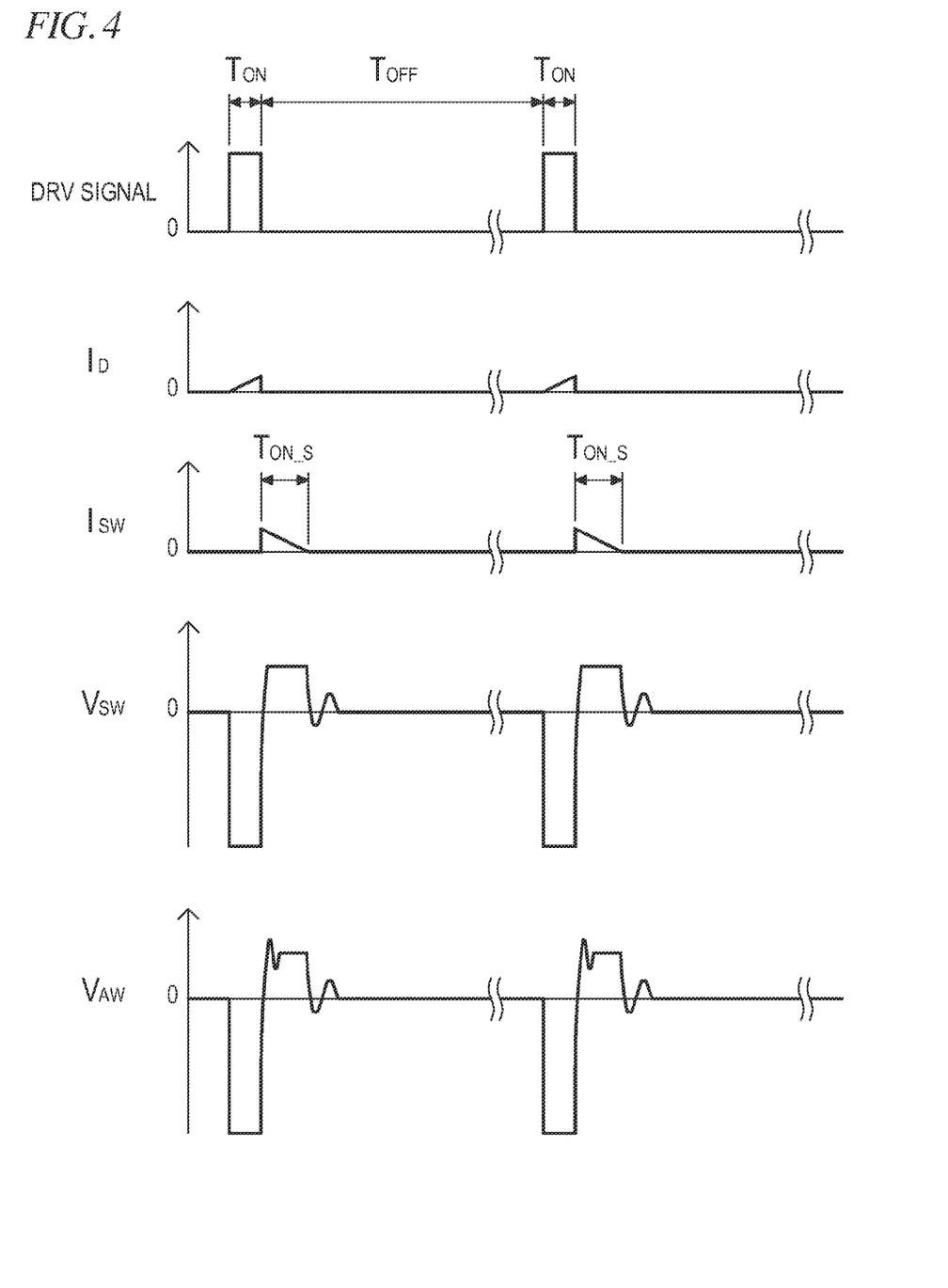
FIG. 4 is a waveform diagram showing operations of respective units of the switching power supply apparatus of FIG. 1.

FIG. 4 shows an exemplary operation of the switching power supply apparatus 1.

According to a switching operation of the switching element Q1 of the control circuit section 3, during an ON period $T_{ON}$ of the switching element Q1, a drain current $I_D$ flows through the primary winding PW of the transformer T and energy is accumulated in the transformer T. During an OFF period $T_{OFF}$ of the switching element Q1, a secondary current $I_{SW}$ flows through the secondary winding SW, and the energy accumulated in the transformer T is output from the secondary winding SW.

During a secondary side conduction period $T_{ON\_S}$ in which a secondary current $I_{SW}$ flows through the secondary winding SW, the secondary winding voltage $V_{SW}$ changes in a stepped form. The secondary winding SW and the auxiliary winding AW have the same polarities, and the auxiliary winding voltage $V_{AW}$ is proportional to the secondary winding voltage $V_{SW}$ induced in the secondary winding SW. Hence, during the secondary side conduction period $T_{ON\_S}$, the auxiliary winding voltage $V_{AW}$ also changes in a stepped form.

The S/H circuit 18 (FIG. 2) of the control circuit section 3 to which the feedback signal $V_{FB}$ generated by the auxiliary winding voltage $V_{AW}$ is input is configured to hold a signal level just before the feedback signal $V_{FB}$ falls down. Thus, the signal level of the feedback signal $V_{FB}$ held in the S/H circuit 18 is relevant to the auxiliary winding voltage $V_{AW}$ at the end of the secondary side conduction period $T_{ON\_S}$.

The feedback signal generation circuit section 5 for generating the feedback signal $V_{FB}$ is configured to correct the signal level of the feedback signal held in the S/H circuit 18 to have a signal level corresponding to light or heavy conditions of the load 6 based on a length of the secondary side conduction period $T_{ON\_S}$ so as to compensate for a voltage drop by the cable 7 that varies according to the load.

Figure 5:
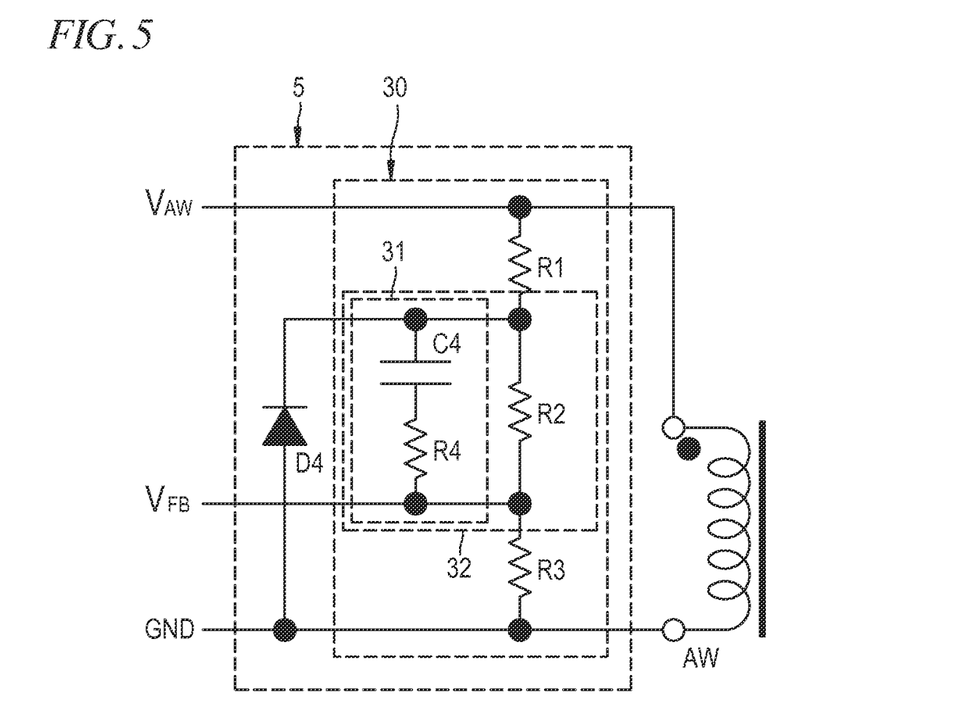
FIG. 5 is a block diagram of a feedback signal generation circuit section of the switching power supply apparatus of FIG. 1.

FIG. 5 shows the configuration of the feedback signal generation circuit section 5.

The feedback signal generation circuit section 5 includes a voltage divider circuit 30 and a diode D4.

The voltage divider circuit 30 has resistances R1, R2 and R3, which are coupled between both terminals of the auxiliary winding AW of the transformer T and are sequentially provided in series from the terminal side of the auxiliary winding AW that becomes a positive terminal (high potential terminal) during the secondary side conduction period $T_{ON\_S}$ in which current flows through the secondary winding SW, and a CR serial circuit 31 that consists of a resistance R4 and a capacitor C4. The CR serial circuit 31 is provided parallel with the resistance R2 and configures a resistance circuit 32 as another voltage divider circuit resistance, which configures the voltage divider circuit 30, together with the resistance R2.

The voltage divider circuit 30 is coupled to the FB terminal (FIG. 2) of the control circuit section 3 at a connection point between the resistance circuit 32 and the resistance R3. Hence, a voltage applied to the resistance R3 is input to the control circuit section 3 as a feedback signal $V_{FB}$.

The diode D4 is provided parallel with the resistance circuit 32 and the resistance R3. An anode of the diode D4 is coupled to a terminal of the auxiliary winding AW that becomes a negative terminal (low potential terminal) during the secondary side conduction period $T_{ON\_S}$, and a cathode thereof is coupled to a connection point between the resistance R1 of the voltage divider circuit 30 and the resistance circuit 32.

Since an auxiliary winding voltage $V_{AW}$ induced in the auxiliary winding AW during the secondary side conduction period $T_{ON\_S}$ is applied to the diode D4 as a reverse bias, electric current flows via the resistance R1, the resistance circuit 32, and the resistance R3. Hence, the auxiliary winding voltage $V_{AW}$ is divided according to respective voltage-dividing resistance values of the resistance R1, the resistance circuit 32, and the resistance R3. Since the diode D4 is applied with a voltage divided from the auxiliary winding voltage $V_{AW}$, the diode D4 may use an inexpensive diode having a relatively low withstanding voltage.

A voltage induced in the auxiliary winding AW during the primary side conduction period $T_{ON}$ in which a drain current $I_D$ flows through the primary winding PW has a reverse polarity to that of the secondary side conduction period $T_{ON\_S}$, and is applied to the diode D4 as a forward bias. In this case, the current bypasses the resistance circuit 32 and the resistance R3 and flows via the diode D4 and the resistance R1. A voltage across the resistance circuit 32 and the resistance R3 is clamped to a forward falling voltage $V_F$ of the diode D4 to thereby prevent the capacitor C4 of the resistance circuit 32 and the feedback terminal of the control circuit section 3 from being applied with a voltage of a reverse polarity.

A correlation between the secondary side conduction period $T_{ON\_S}$ and the load will now be described.

Figure 6:
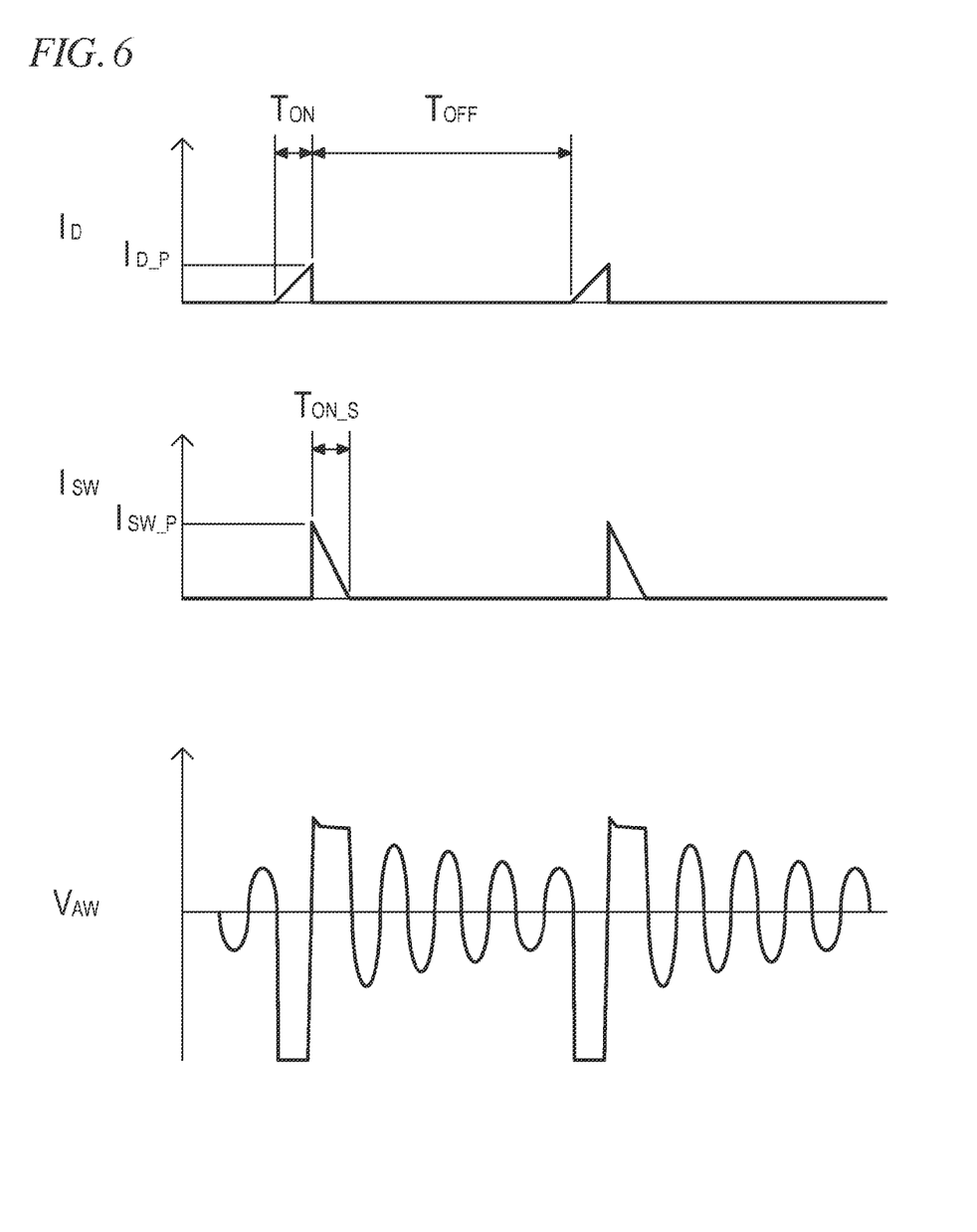
FIG. 6 is a waveform diagram showing illustrative operations of a transformer of the switching power supply apparatus of FIG. 1 in low input voltage and light load conditions.
Figure 7:
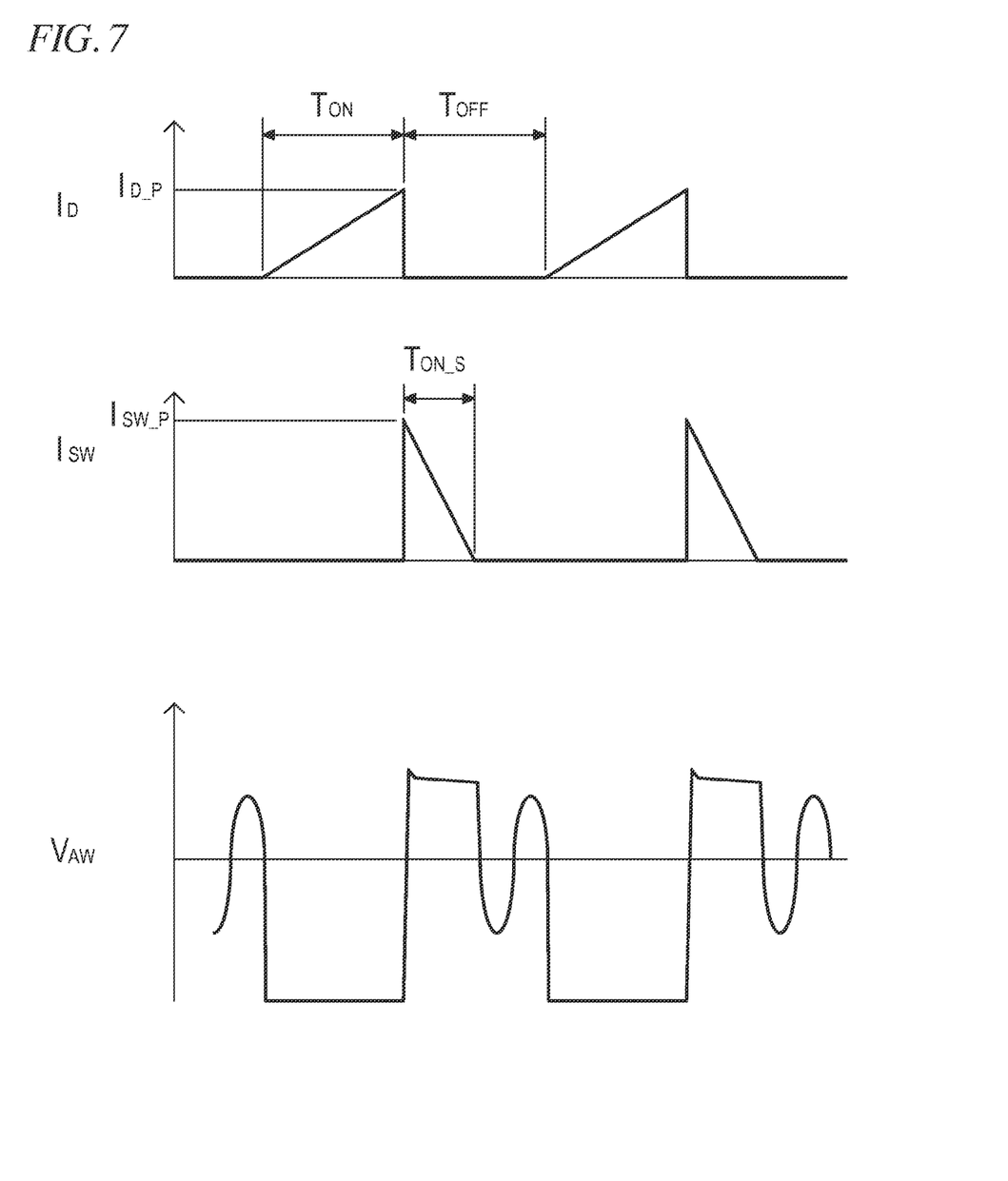
FIG. 7 is a waveform diagram showing illustrative operations of a transformer of the switching power supply apparatus of FIG. 1 in low input voltage and heavy load conditions.
Figure 8:
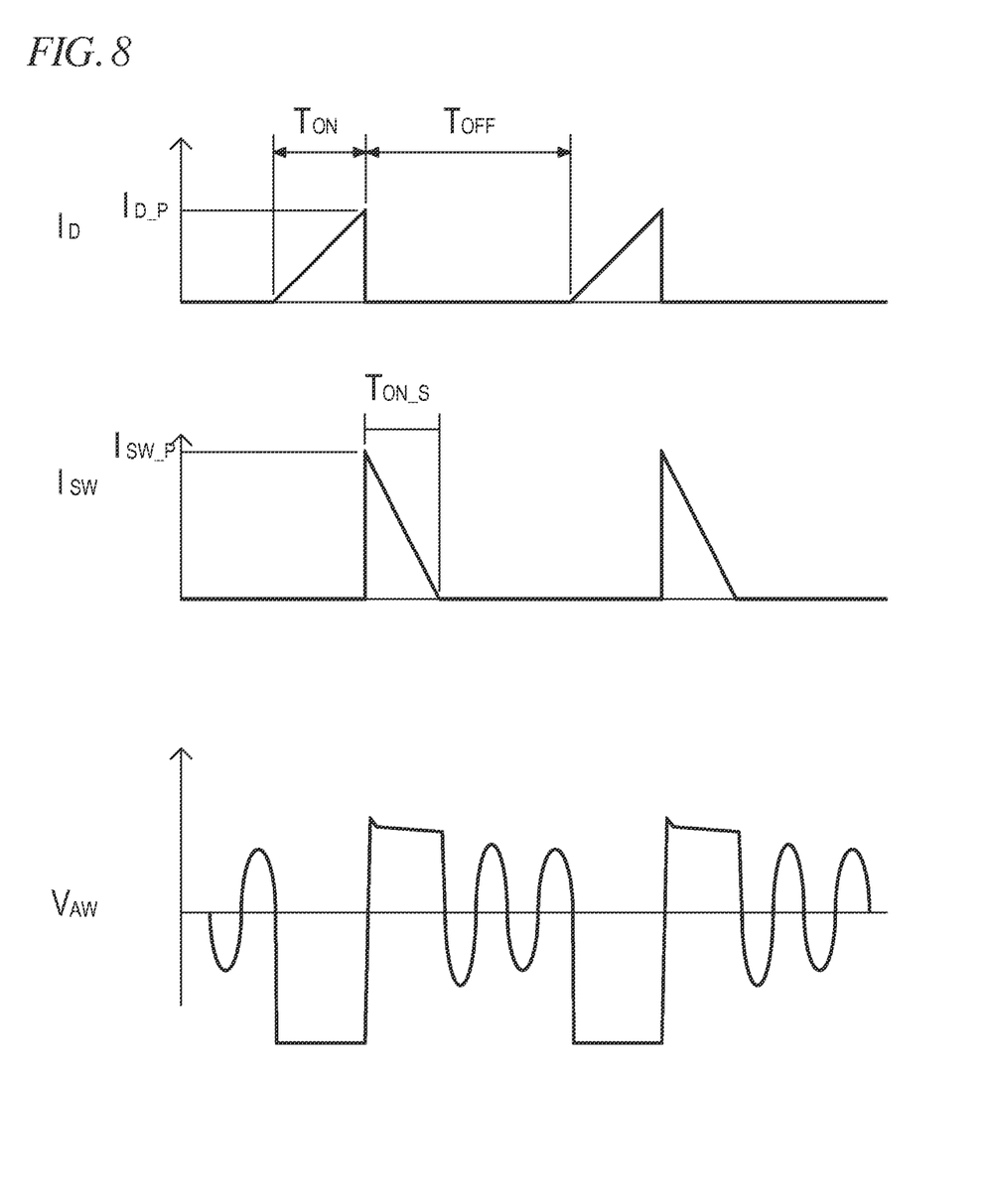
FIG. 8 is a waveform diagram showing illustrative operations of a transformer of the switching power supply apparatus of FIG. 1 in high input voltage and heavy load conditions.

FIGS. 6 to 8 shows waveforms of the drain current $I_D$, the secondary side current $I_{SW}$, and the auxiliary winding voltage $V_{AW}$, in which FIG. 6 shows the waveforms in low input voltage and light load conditions, FIG. 7 shows the waveforms in low input voltage and heavy load conditions, and FIG. 8 shows the waveforms in high input voltage and heavy load conditions.

The secondary side conduction period $T_{ON\_S}$ may be expressed by the Equation 1 below.

Equation 1

$$T_{ON\_S} = \frac{I_{SW\_P} \cdot L_S}{V_{OUT}} \quad (1)$$

$$= \frac{1}{V_{OUT}} \cdot \frac{N_P}{N_S} I_{D\_P} \cdot L_P \frac{N_S^2}{N_P^2} = \frac{I_{D\_P} L_P}{V_{OUT}} \cdot \frac{N_S}{N_P}$$

In the Equation 1, $I_{D\_P}$ denotes a peak value of the drain current $I_D$, $I_{SW\_P}$ denotes a peak value of the secondary side current $I_{SW}$, and $V_{OUT}$ denotes an output voltage of the output circuit section 4. $L_P$ denotes inductance of the primary winding PW, $L_S$ denotes inductance of the secondary winding SW, $N_P$ denotes the number of windings of the primary winding PW, and $N_S$ denotes the number of windings of the secondary winding SW, in which all of these are the constant numbers determined by the circuit.

Input power $P_{IN}$ input to the primary winding PW of the transformer T may be expressed by the Equation 2 below.

Equation 2

$$P_{IN} = V_{IN} \times I_D \qquad (2)$$
$$= \frac{1}{2} L_P I_{D\_P}^2 \frac{1}{t} = \frac{1}{2} L_P I_{D\_P}^2 f$$

In the Equation 2, $V_{IN}$ denotes an input voltage input to the primary winding PW. f is a constant value that denotes a frequency (switching frequency) of the clock signal output from the oscillator circuit 13 of the control circuit section 3.

The input power $P_{IN}$ is transferred to the secondary side of the transformer T. In the same load conditions, the input power $P_{IN}$ and the peak value $I_{D\_P}$ of the drain current are constant. Accordingly, the control circuit section 3 needs to control the primary side conduction period $T_{ON}$ depending upon the input voltage $V_{IN}$ in order to maintain a constant peak value $I_{D\_P}$ of the drain current in the same load conditions.

Since as described above, in the Equation 1, all of the peak value $I_{D\_P}$ of the drain current, the primary winding inductance $L_P$, the primary side windings number $N_P$, and the secondary side windings number $N_S$ are constant and the output voltage $V_{OUT}$ is controlled to have a constant value, the secondary side conduction period remains constant in the same load conditions, irrespective of the $V_{IN}$.

When the load changes as shown in FIG. 6, FIG. 7, and FIG. 8, the primary side conduction period (ON period of the switching element Q1) $T_{ON}$, the primary side non-conduction period (OFF period of the switching element Q1) $T_{OFF}$, and the secondary side conduction period $T_{ON\_S}$ changes respectively. However, in the same load conditions as shown in FIGS. 7 and 8, although the primary side conduction period $T_{ON}$ changes, the secondary side conduction period $T_{ON\_S}$ does not change. That is, the secondary side conduction period $T_{ON\_S}$ is a parameter that changes in response to the load, irrespective of the input.

Hence, to match the signal level of the feedback signal $V_{FB}$ with a length of the secondary side conduction period $T_{ON\_S}$ is to match the signal level with the light or heavy conditions of the load.

Figure 9:
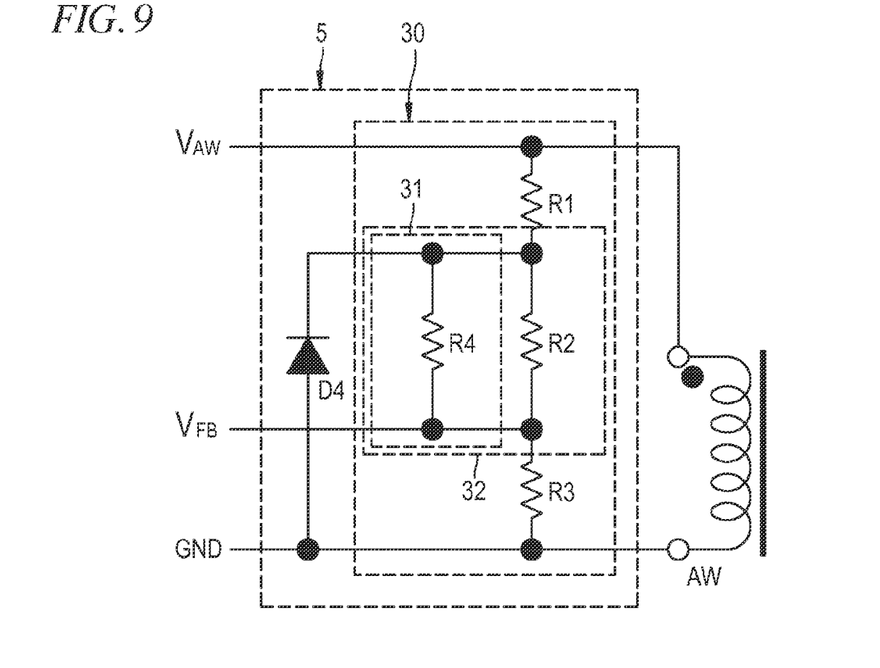
FIG. 9 is a block diagram showing an equivalent circuit of the feedback signal generation circuit section of FIG. 4 in light load conditions.
Figure 10:
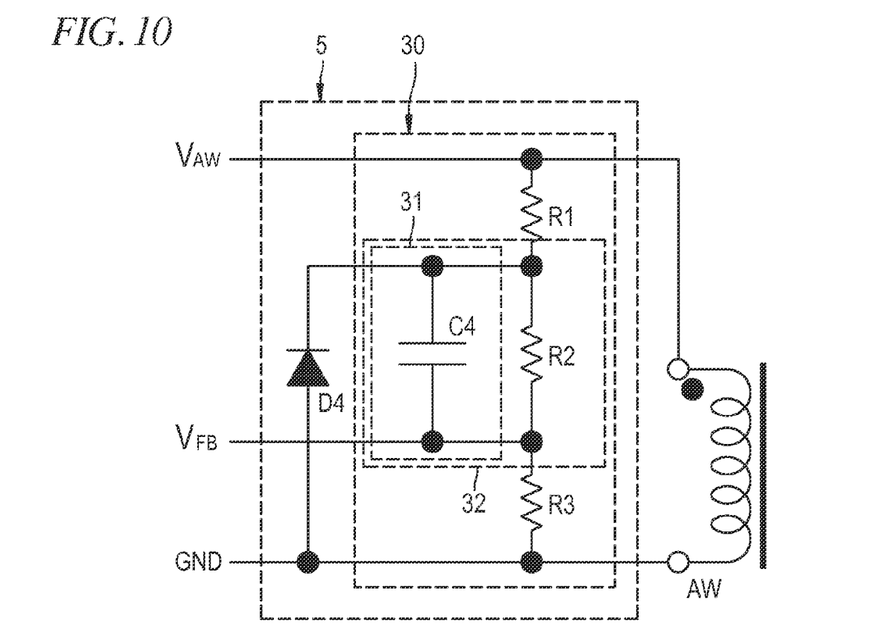
FIG. 10 is a block diagram showing an equivalent circuit of the feedback signal generation circuit section of FIG. 4 in heavy load conditions.

FIGS. 9 and 10 are equivalent circuits showing the behaviors of the feedback signal generation circuit section 5 during the secondary side conduction period $T_{ON\_S}$, in which FIG. 9 shows the state in the very light load conditions (e.g. no load conditions), and FIG. 10 shows the state in the very heavy load conditions. The equivalent circuits of FIGS. 9 and 10 are provided to easily describe the operation of the circuit according to the present embodiment. In actual use, the circuit does not act as the capacitor circuit or resistance circuit shown in FIG. 9 or 10, and the behavior of the feedback signal generation circuit section 5 follows the behavior of the CR serial circuit having the capacitor and the resistance.

As described above, during the secondary side conduction period $T_{ON\_S}$, the auxiliary winding voltage $V_{AW}$ in a stepped form is input to the auxiliary winding AW. In response to this input of the auxiliary winding voltage $V_{AW}$, the resistance circuit 32 that configures one voltage-dividing resistance of the voltage divider circuit 30 induces a transient phenomenon, i.e., an increase in a voltage-dividing resistance value r thereof, with the integration of the CR serial circuit 31.

At the light load conditions, since the secondary side conduction period $T_{ON\_S}$ is short and a small quantity of current flows through the voltage divider circuit 30, the capacitor C4 of the CR serial circuit 31 is hardly charged, so that actually, the voltage divider circuit 30 becomes equivalent to the circuit shown in FIG. 9. In this case, the voltage-dividing resistance value r of the resistance circuit 32 is a value that is obtained by a combination of a value $R_2$ of the parallel resistance R2 and a value $R_4$ of the resistance R4, in which the value r is smaller than the value $R_2$ of the resistance R2.

At the heavy load conditions, the secondary side conduction period $T_{ON\_S}$ is long and the capacitor C4 of the CR serial circuit 31 is charged. When the capacitor C4 is fully charged, the current does not flow through the resistance R4 of the CR serial circuit 31, so that actually, the voltage divider circuit 30 becomes equivalent to the circuit of FIG. 10. In this case, the voltage-dividing resistance value r of the resistance circuit 32 becomes the value $R_2$ of the resistance R2.

That is, the voltage-dividing resistance value r of the control circuit section 32 during the secondary side conduction period $T_{ON\_S}$ is in a range of $R_2 \cdot R_4/(R_2+R_4) < r < R_2$, and as the secondary side conduction period $T_{ON\_S}$ is made longer, that is, as the load becomes heavier, the value r increases.

A voltage across the resistance R3 that is output as the feedback signal $V_{FB}$ during the secondary side conduction period $T_{ON\_S}$ may be expressed by the Equation 3 below. As can be clearly seen from the Equation 3, the voltage decreases as the voltage-dividing resistance value r of the resistance circuit 32 increases. Hence, the signal level of the feedback signal $V_{FB}$ increases as the secondary side conduction period $T_{ON\_S}$ increases, that is, as the load becomes heavier.

Equation 3

$$V_{FB} = V_{AW} \times \frac{R_3}{R_1 + r + R_3} \qquad (3)$$

In the Equation 3, $R_1$ is a value of the resistance R1, and $R_3$ is a value of the resistance R3.

Figure 11:
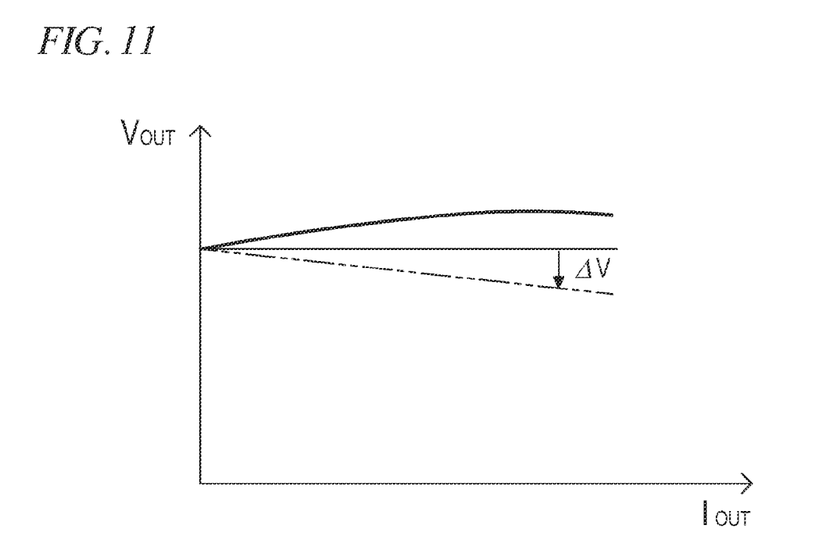
FIG. 11 is a graph showing a correlation between an output voltage of a cable of the switching power supply apparatus of FIG. 1 and a load coupled to the cable.

FIG. 11 shows a correlation between an output voltage of a cable and the load.

As described above, the feedback signal generation circuit section 5 lowers the signal level of the feedback signal $V_{FB}$ as the load becomes heavier. The control circuit section 3 to which the feedback signal $V_{FB}$ is input controls the feedback signal $V_{FB}$ to have a constant value (reference value $V_{REF}$). Hence, as shown with a solid line in FIG. 11, as the load 6 increases, that is, as the current $I_{OUT}$ flowing through the load 6 increases, an output voltage $V_{OUT}$ of the output circuit section 4 increases. Accordingly, a voltage drop ($\Delta V$) caused by the cable 7 that varies according to the load is compensated, and an output voltage of the cable 7 is stabilized irrespective of the load 6.

Here, a time constant τ of the CR serial circuit 31 (the product of the capacitance C4 of the capacitor C4 and the value $R_4$ of the resistance R4: C4·R4) may preferably equal to or larger than a secondary side maximum conduction period $T_{ON\_SMAX}$ that corresponds to a primary side maximum conduction period $T_{ON\_MAX}$. Preferable conditions of the time constant τ of the CR serial circuit 31 will be described according to a charge period and a discharge period of the capacitor C4.

First, the charge period of the capacitor C4 will be described.

The control circuit section 3 controls a voltage across the resistance R3 during the secondary side conduction period $T_{ON\_S}$ to have a constant value (reference voltage $V_{REF}$). The current I flowing through the voltage divider circuit 30 has a constant value that is expressed by the below Equation 4 using the reference voltage $V_{REF}$ and the value $R_3$ of the resistance R3.

Equation 4

$$I = \frac{V_{REF}}{R_3} \quad (4)$$

The current I is divided into a resistance R2 side current and a CR serial circuit 31 side current, in which a division ratio changes with the time t from the start of the secondary side conduction period $T_{ON\_S}$. At the start of the secondary side conduction period $T_{ON\_S}$, the current I is divided by a resistance ratio between the resistances R2 and R4. The current flowing through the CR serial circuit 31 during the secondary side conduction period $T_{ON\_S}$ charges the capacitor C4.

When the current flowing through the CR serial circuit 31 is denoted as $I_1(t)$, and the current flowing through the resistance R2 is denoted as $I_2(t)$, the voltage drop $V_{R2}$ at the resistance R2, which occurs due to the flow of the current $I_2(t)$, may be expressed by the Equation 5 below.

Equation 5

$$V_{R2}(t) = R_2 I_2(t) = R_2[I - I_1(t)] = R_2 \frac{V_{REF}}{R_3} \left[1 - \frac{R_2}{R_2 + R_4} \exp\left(-\frac{t}{C_4 R_4}\right)\right] \quad (5)$$

The operation of the feedback signal generation circuit section 5 during the charge period (the secondary side conduction period $T_{ON\_S}$) has been described heretofore.

Next, the discharge period of the capacitor C4 will be described.

It is assumed that the capacitor C4 is fully discharged during the period $T_{dc}$ excepting the secondary side conduction period $T_{ON\_S}$ from one cycle T of the switching operation of the switching element Q1. The charges charged in the capacitor C4 are discharged to a closed-loop consisting of the capacitor C4, the resistance R2, and the resistance R4 by the diode D4, in which the time constant equals $C_4 \cdot (R_2 + R_4)$.

A voltage (a voltage at the start of the discharge period) of the capacitor C4 after the elapse of the charge period $T_{ON\_S}$ may be expressed by the below Equation 6 from the Equation 5.

Equation 6

$$V_{C4}(T_{ON\_S}) = V_{R2}(T_{ON\_S}) - R_4 I_1(T_{ON\_S}) \quad (6)$$
$$= R_2 \frac{V_{REF}}{R_3} \left\{1 - \exp\left(\frac{-T_{ON\_S}}{C_4 R_4}\right)\right\}$$

The discharge quantity during the charge period $T_{ON\_S}$ can be expressed by the below Equation 7 from the above equation 6.

Equation 7

$$V_{C4\_dc}(T_{dc}) = \frac{V_{REF} R_2}{R_3} \left\{1 - \exp\left(-\frac{T_{ON\_S}}{C_4 R_4}\right)\right\} \exp\left(-\frac{T - T_{ON\_S}}{2 C_4 (R_2 + R_4)}\right) \quad (7)$$

The operation of the feedback signal generation circuit section 5 during the discharge period of the capacitor C4 has been described heretofore.

Finally, $V_{R2}$ is determined by a difference between a charge curve expressed by the Equation 5 and a discharge curve expressed by the Equation 7.

Figure 12:
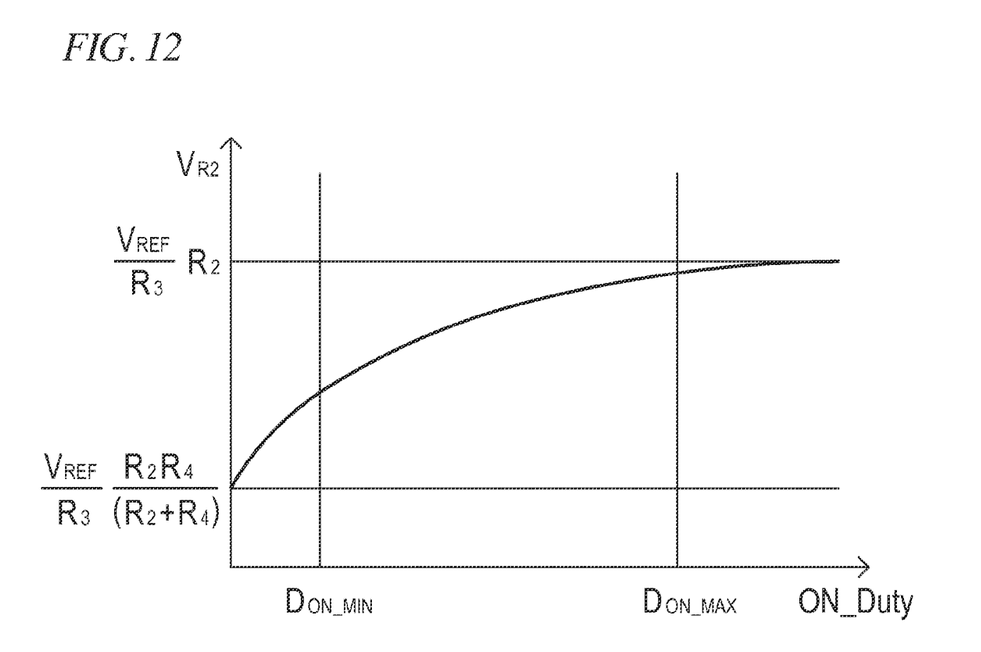
FIG. 12 is a graph showing characteristics of the feedback signal generation circuit section of FIG. 4.
Figure 13:
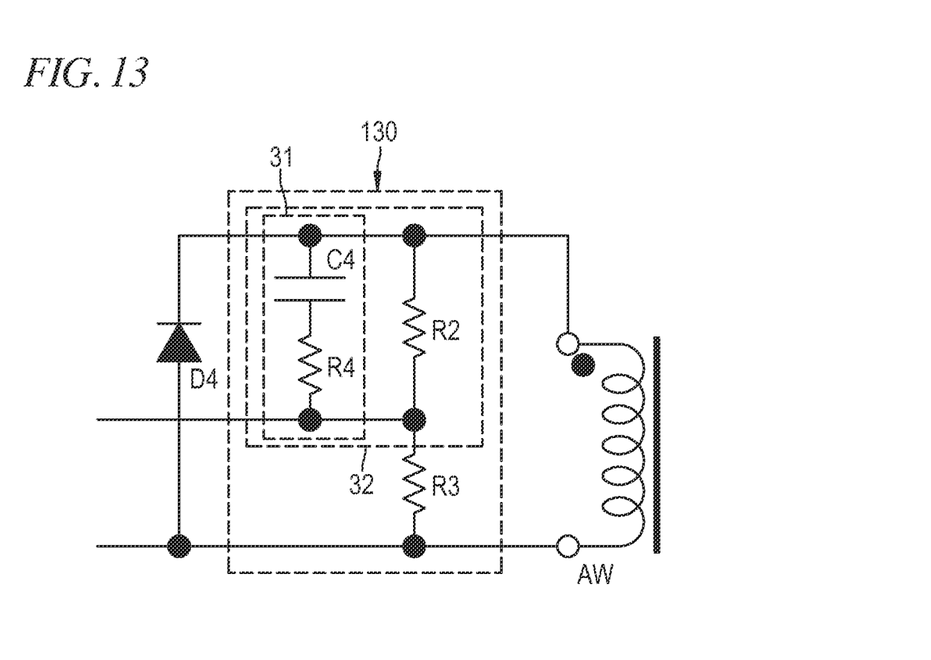
FIG. 13 is a block diagram showing a modified example of the feedback signal generation circuit section of FIG. 4.

As set forth before, the feedback signal generation circuit section 5 changes the voltage-dividing resistance value r of the resistance circuit 32 depending upon the length of the secondary side conduction period $T_{ON\_S}$, by charging the capacitor C4 of the CR serial circuit 31, thereby generating the feedback signal $V_{FB}$ of the signal level according to the lightness or heaviness of the load 6. Hence, it is important that a voltage of the capacitor C4 changes throughout the light to heavy load conditions. Further, it is also important to select conditions that as shown in FIG. 12, a voltage $V_{R2}$ of the resistance R2 gently changes depending upon the time constant τ of the CR serial circuit 31 for the minimum and maximum values $D_{ON\_MIN}$ and $D_{ON\_MAX}$ of an ON duty (a ratio of the occupied primary side conduction period $T_{ON}$ in a cycle T) determined owing to system limitations of the switching power supply apparatus 1. Hence, the time constant τ of the CR serial circuit 31 may preferably equal to or larger than the secondary side maximum conduction period $T_{ON\_SMAX}$ that corresponds to the primary side maximum conduction period $T_{ON\_MAX}$.

Here, the secondary side conduction period $T_{ON\_S}$ may be expressed by the below Equation 8 that is modified from the Equation 1.

Equation 8

$$T_{ON\_S} = \frac{I_{D\_P} L_P}{V_{OUT}} \cdot \frac{N_S}{N_P} = \frac{T_{ON} V_{IN}}{V_{OUT}} \cdot \frac{N_S}{N_P} \quad (8)$$

Hence, preferred conditions that the time constant τ ($C_4 \cdot R_4$) of the CR serial circuit 31 should satisfy may be expressed by the below Equation 9.

Equation 9

$$C_4 R_4 \geq T_{ON\_SMAX} = \frac{T_{ON\_MAX} V_{IN}}{V_{OUT}} \cdot \frac{N_S}{N_P} \quad (9)$$

According to the switching power supply apparatus 1, the signal level of the feedback signal $V_{FB}$ is changed depending upon the length of the secondary side conduction period $T_{ON\_S}$, so that the signal level depends upon the light or heavy conditions of the load 6. This configuration compensates for the voltage drop by the cable 7 that varies according to the load, thereby supplying a stabilized voltage to the load 6. Further, this compensation (value or quantity) does not depend upon a change in input of an input voltage, so that a stabilized voltage is supplied to the load 6. Further, even in the case of the switching power supply apparatus 1 that does not use the cable 7, in regard of the precision of the voltage output, an output voltage may decrease with a load current according to the forward voltage of the diode D2. Such voltage decrease can be compensated by adjusting the time constant of the CR serial circuit 31.

In the feedback signal generation circuit section 5 for generating the feedback signal $V_{FB}$, the CR serial circuit 31 is only provided parallel with the voltage dividing resistance R2 that has a high potential compared to the output point of the feedback signal $V_{FB}$ in the voltage divider circuit 30. Hence, only adding a simple circuit with a few elements to an existing primary-detection type switching power supply apparatus has the above-mentioned effects. Further, since the effects are obtained by the correction of the feedback signal $V_{FB}$ itself, there is no need to modify the control circuit section 3 having ICs or the like.

As set forth before, the specification describes following items.

(1) A switching power supply apparatus comprising:
a transformer having a primary winding, a secondary winding, and an auxiliary winding;
a switching element coupled in series to the primary winding;
an output circuit section configured to generate a voltage output from the power transferred from the primary winding to the secondary winding in response to a switching operation of the switching element;
a feedback signal generation circuit section configured to, during a secondary side conduction period in which an electric current flows through the secondary winding, generate a feedback signal having a signal level corrected based on a length of the secondary side conduction period, from an auxiliary winding voltage induced in the auxiliary winding; and
a control circuit section configured to drive the switching element based on the feedback signal.

(2) The switching power supply apparatus according to (1), wherein
the feedback signal generation circuit section includes a voltage divider circuit configured to divide the auxiliary winding voltage to output the feedback signal, and
the voltage divider circuit is provided, on a side of a terminal of the auxiliary winding, with a resistance circuit inducing a transient phenomenon that a voltage-dividing resistance value increases with respect to a stepped input voltage, the terminal of the auxiliary winding having a positive potential relative to an output point of the feedback signal during the secondary side conduction period.

(3) The switching power supply apparatus according to (2), wherein the resistance circuit includes a CR serial circuit including a first resistance and a capacitor, and a second resistance provided parallel with the CR serial circuit.

(4) The switching power supply apparatus according to (3), wherein a time constant of the CR serial circuit is longer than a maximum length of the secondary side conduction period.

(5) The switching power supply apparatus according to (3), wherein the feedback signal generation circuit section is provided parallel with the resistance circuit between both terminals of the auxiliary winding, and includes a diode to which the auxiliary winding voltage is applied as a reverse bias.

(6) The switching power supply apparatus according to (5), wherein the voltage divider circuit includes a third resistance on a side of the terminal of the auxiliary winding having a positive potential relative to the resistance circuit during the secondary side conduction period, the diode being coupled to the auxiliary winding via the third resistance.

(7) A method of controlling a switching power supply apparatus comprising: a transformer having a primary winding, a secondary winding, and an auxiliary winding; and a switching element coupled in series to the primary winding, power being transferred from the primary winding to the secondary winding in response to a switching operation of the switching element, the method comprising:
generating a feedback signal having a signal level corrected based on a length of the secondary side conduction period, from a voltage induced in the auxiliary winding during a secondary side conduction period in which an electric current flows through the secondary winding; and
driving the switching element based on the feedback signal.

What is claimed is:

1. A switching power supply apparatus comprising:
a transformer having a primary winding, a secondary winding, and an auxiliary winding;
a switching element coupled in series to the primary winding;
an output circuit section configured to generate a voltage output from the power transferred from the primary winding to the secondary winding in response to a switching operation of the switching element;
a feedback signal generation circuit section configured to, during a secondary side conduction period in which an electric current flows through the secondary winding, generate a feedback signal having a signal level corrected based on a length of the secondary side conduction period, from an auxiliary winding voltage induced in the auxiliary winding, the feedback signal generation circuit comprising a voltage divider circuit configured to divide the auxiliary winding voltage to output the feedback signal, wherein the voltage divider circuit comprises a signal level correction resistance circuit configured to induce a transient phenomenon in which a voltage-dividing resistance value of the voltage divider circuit increases with respect to a stepped input voltage; and
a control circuit section configured to drive the switching element based on the feedback signal.

2. The switching power supply apparatus according to claim 1, wherein
the voltage divider circuit is provided on a side of a terminal of the auxiliary winding having a positive potential relative to an output point of the feedback signal during the secondary side conduction period.

3. The switching power supply apparatus according to claim 2, wherein the signal level correction resistance circuit comprises a CR serial circuit including a first resistance and a capacitor, and a second resistance provided parallel with the CR serial circuit.

4. The switching power supply apparatus according to claim 3, wherein a time constant of the CR serial circuit is longer than a maximum length of the secondary side conduction period.

5. The switching power supply apparatus according to claim 3, wherein the feedback signal generation circuit section is provided parallel with the signal level correction resistance circuit between both terminals of the auxiliary winding, and comprises a diode to which the auxiliary winding voltage is applied as a reverse bias.

6. The switching power supply apparatus according to claim 5, wherein the voltage divider circuit comprises a third resistance on a side of the terminal of the auxiliary winding having a positive potential relative to the signal level correction resistance circuit during the secondary side conduction period, the diode being coupled to the auxiliary winding via the third resistance.

7. A method of controlling a switching power supply apparatus comprising: a transformer having a primary winding, a secondary winding, and an auxiliary winding; a switching element coupled in series to the primary winding, power being transferred from the primary winding to the secondary winding in response to a switching operation of the switching element; and a feedback signal generation circuit comprises a voltage divider circuit, the method comprising:

generating a feedback signal having a signal level corrected based on a length of a secondary side conduction period, from a voltage induced in the auxiliary winding during the secondary side conduction period in which an electric current flows through the secondary winding; wherein generating the feedback signal comprises inducing a transient phenomenon in which a voltage-dividing resistance value of the voltage divider circuit increases with respect to a stepped input voltage; and driving the switching element based on the feedback signal.

* * * * *